Patented Aug. 8, 1950

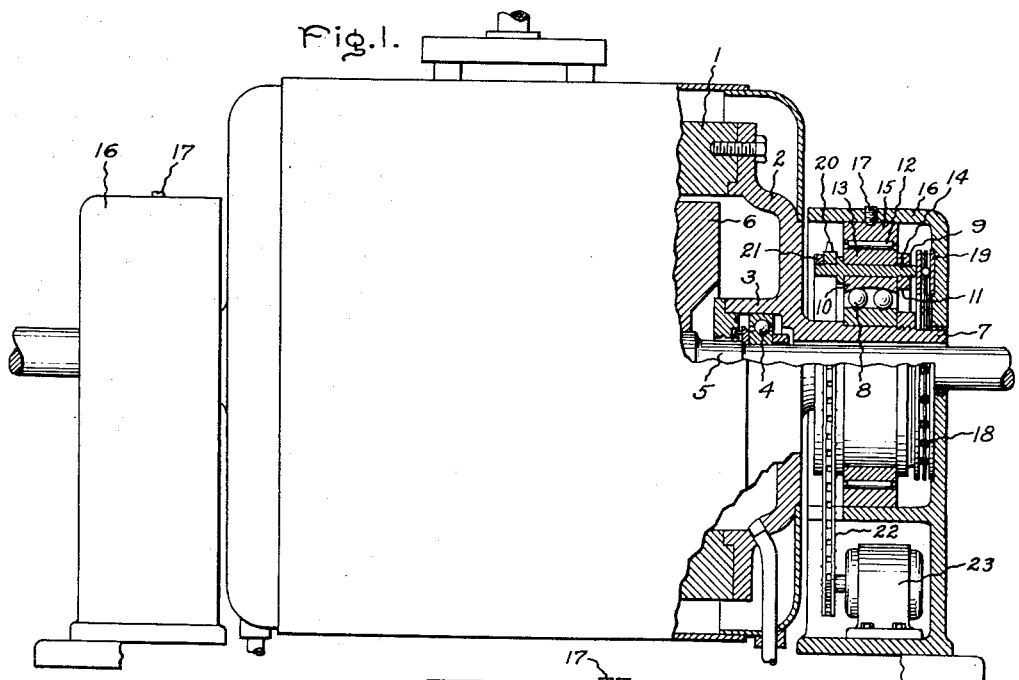
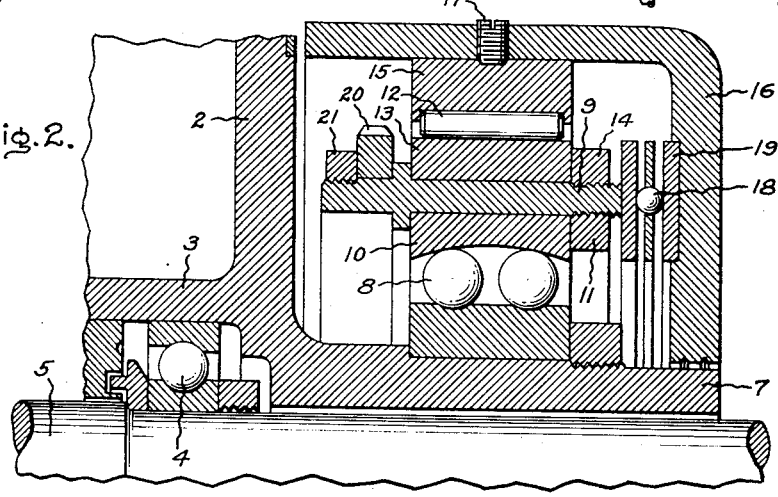
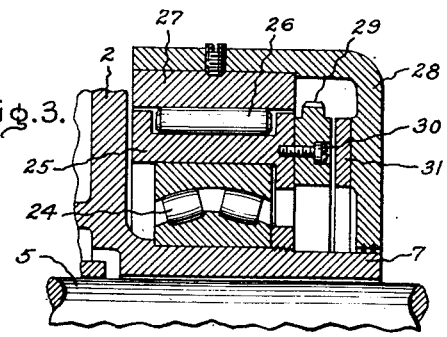

2,518,159

UNITED STATES PATENT OFFICE 2,518,159

BEARING SUPPORT FOR DYNAMOELECTRIC MACHINES

Harold M. Martin, Schenectady, N. Y., assignor to General Electric Company, a corporation of New York Application May 11, 1945, Serial No. 593,149

5 Claims. (Cl. 308—183)

My invention relates to dynamoelectric machines and particularly to such as are adapted to be used as measuring devices and the like for absorbing and measuring the torque of a prime mover.

An object of my invention is to provide an improved dynamoelectric machine.

Another object of my invention is to provide an improved dynamoelectric machine having a bearing supporting means which will minimize the effect of friction on the operation of the machine.

A further object of my invention is to provide an improved measuring device, such as a dynamoelectric machine used as a dynamometer, by an arrangement for minimizing the effect of friction on the support of the device and minimizing localized wear of the supporting bearings.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a side elevational view, partly broken away, of a dynamoelectric machine adapted to be used as a measuring device or dynamometer provided with an embodiment of my invention; Fig. 2 is an enlarged sectional view of a part of the bearing support shown in Fig. 1; and Fig. 3 is a sectional view of a part of another embodiment of my improved bearing supporting construction.

Referring to the drawing, I have shown a dynamoelectric machine adapted to be used as a measuring device, such as a dynamometer, provided with an embodiment of my improved construction. In Figs. 1 and 2, this machine includes a pair of relatively rotatable members adapted to react electrodynamically relative to each other. The outer relatively rotatable member 1 is shown as the eddy current armature of an inductor type dynamometer which is provided with end shields 2 formed with inner bearing supporting flanges 3 in which suitable bearings, such as antifriction ball bearings 4 are mounted for rotatably supporting the shaft 5 of the inner relatively rotatable member 6. In this manner the rotatable member 6 is rotatably supported by the outer member 1, and this outer member is provided with an outwardly extending supporting flange 7 formed on the end shields 2 at each end of the machine which are supported by suitable antifriction self-aligning thrust transmitting bearings 8 having an outer supporting member 9 to which the outer bearing race 10 of the antifriction bearing 8 is locked by any suitable means, such as a nut 11 which threadedly engages an end of the supporting member 9. This outer supporting member 9 is rotatably supported by a non-thrust transmitting antifriction bearing, such as needle bearing 12 which is provided with an inner race 13 secured to the outer supporting member 9 by any suitable means, such as a nut 14 which threadedly engages the ends of the supporting member 9. The needle bearing 12 is provided with an outer bearing race 15 which is mounted in the pedestal 16 and is secured in position in any suitable manner, as by a setscrew 17. The end thrust which is transmitted through the bearing 8 to the outer supporting member 9 is resisted by an antifriction ball bearing 18 which in this construction is provided with an outer race 19 mounted in the pedestal 16 and engages the end of the bearing outer supporting member 9.

In machines of this type which are used as dynamometers, the outer relatively rotatable member 1 is adapted to rotate through a limited arc and therefore parts of the races of the bearings that support the weight are apt to become worn if they remain continuously in the same position. In addition, the static friction in the bearings is apt to cause an inaccuracy in the measurements of the dynamometer. In order to overcome both of these difficulties, I provide a motor driven arrangement for continuously and slowly rotating in opposite directions the bearings at opposite ends of the machine. In the arrangement shown in Figs. 1 and 2, this is obtained by driving the bearing outer supporting member 9 through a gear or sprocket member 20 which is mounted on the supporting member 9 and secured thereto in any suitable manner, as by a nut 21 which threadedly engages the member 9. This gear 20 is shown as driven by a suitable chain 22 which in turn is driven by a motor 23 mounted in the base of the pedestal 16. By providing motors 23 in the pedestals at the opposite ends of the machine which rotate in opposite directions, the bearing outer supporting members 9 at opposite ends of the machine are rotated in opposite directions and thereby continuously change the position of the bearing races 19 and 13 of the bearings 8 and 12 respectively and minimize the effect of static friction on the measurements of the machine. Furthermore, since these bearings are rotated in opposite directions at the two ends of the machine, the resultant or net effect of this rotation on the outer member 1 of the machine is substantially neutralized as the frictional forces on opposite ends of the machine will be substantially equal and opposite in direction. This rotation also prevents the bearing wear from being localized and results in more accurate operation over long periods of time.

In Fig. 3 I have shown another construction of the supporting arrangement for my improved dynamoelectric machine in which the outer member 1 is supported at each end of the machine through the end shields 2 having a flange 7 supported by a self-alining antifriction thrust transmitting bearing 24 which is mounted in an outer supporting member 25 which forms the inner race of a nonthrust transmitting needle bearing 26 having an outer race 27 mounted in a pedestal 28. In machines of large sizes, this construction is particularly useful as it eliminates the necessity for an extra inner race for the needle bearing 26 and thereby also permits the use of a relatively smaller size pedestal 28. This figure also shows another suitable construction for driving the outer race of the thrust transmitting bearing 24 and the inner race 25 of the needle bearing 26 through a suitable gear or sprocket 29 secured to the bearing outer supporting member and race 25 by a plurality of countersunk screws 30. This sprocket gear is arranged on the outer side of the bearing outer supporting member 25 and is adapted to engage a suitable bearing plate 31 mounted in the pedestal 28 for transmitting thrust thereto from the bearing 24. In this construction, the gear or sprocket 29 may be driven in any suitable manner by a motor, either directly by a gear or through a chain, as shown in Fig. 1. As in the construction shown in Fig. 1, the bearing supporting members at the two ends of the machine are driven in opposite directions so as to minimize the effect of the friction in the bearings on the torque of the outer member of the machine and the rotation of the races of the inner and outer bearings 24 and 26 minimizes local wear of the bearings and thereby prolongs the life of the equipment.

While I have illustrated and described particular embodiments of my invention, modifications thereof will occur to those skilled in the art. I desire it to be understood therefore that my invention is not to be limited to the particular arrangements disclosed and I intend in the appended claims to cover all modifications which do not depart from the spirit and scope of my invention.

What I claim as new and desire to secure by Letters Patent of the United States is:

1. A supporting structure for a dynamoelectric machine having relatively rotatable inner and outer members, said inner member being mounted on a rotatable shaft, means on said outer member for rotatably supporting said shaft, an outwardly extending flange portion on each end of said outer member surrounding said shaft, a support housing for rotatably supporting each end of said outer member, said support housing mounting a bearing assembly comprising a self-aligning thrust transmitting bearing surrounding said flange portion and having an outer supporting member, a non-thrust transmitting bearing surrounding said outer supporting member, and a thrust bearing between an end of said outer supporting member and a wall of the support housing; a gear secured to each of said outer supporting members, and motor means operatively connected to each of said gears for rotating in opposite directions said outer supporting members at opposite ends of said machine.

2. A supporting structure for a dynamoelectric machine having relatively rotatable inner and outer members, said inner member being mounted on a rotatable shaft, means on said outer member for rotatably supporting said shaft, an outwardly extending flange portion on each end of said outer member surrounding said shaft, a pedestal for rotatably supporting each end of said outer member, each of said pedestals mounting a bearing assembly comprising a self-aligning thrust transmitting ball bearing having an inner race secured to said flange portion and an outer race secured to an outer supporting member, a non-thrust transmitting needle bearing having an inner race secured to said outer supporting member, and a ball thrust bearing between said supporting member and a wall of said pedestal for resisting thrust transmitted to said outer supporting member by said first-mentioned bearing; a gear secured to each of said outer supporting members, and motor means operatively connected to each of said gears for rotating in opposite directions said outer supporting members at opposite ends of said machine.

3. A supporting structure for a dynamoelectric machine having a pair of relatively rotatable members, means for rotatably supporting one of said members by the other of said members, supporting housings for rotatably supporting the other of said members, said housings mounting bearing assemblies comprising self-aligning thrust-transmitting bearings surrounded by outer supporting members, bearings between an end of the outer supporting members and the adjacent wall of the support housings for resisting thrust from said outer supporting members, and motor means for rotating in opposite directions said outer supporting members at opposite ends of said dynamoelectric machine.

4. A supporting structure for a dynamoelectric machine having a pair of relatively rotatable members, end flanges on the outer of said members, a support housing for rotatably supporting each of said end flanges, said support housing mounting a bearing assembly comprising a self-aligning thrust-transmitting bearing surrounding said end flange and having an outer supporting member, a non-thrust-transmitting radially aligned bearing supporting said outer supporting member, a thrust resisting bearing between one end of the outer supporting member and a wall of the housing, and motor means for rotating in opposite directions said bearing outer supporting members at opposite ends of said dynamoelectric machine.

5. A supporting structure for a dynamoelectric machine having a pair of relatively rotatable members, a pedestal for rotatably supporting each end of the outer one of said members, each of said pedestals mounting a bearing assembly comprising a self-aligning thrust-transmitting bearing having an outer supporting member, a radially aligned needle bearing for rotatably supporting said bearing outer supporting member, a bearing between said outer supporting member and an end wall of the pedestal for resisting thrust from said outer supporting members, and motor means for slowly rotating in opposite directions said outer supporting members at opposite ends of said dynamoelectric machine.

HAROLD M. MARTIN.

REFERENCES CITED

The following references are of record in the file of this patent:

UNITED STATES PATENTS

| Number | Name | Date |
|---|---|---|
| 945,806 | Rhodes | Jan. 11, 1910 |
| 1,008,643 | Hess | Nov. 14, 1911 |
| 1,229,414 | Clark | June 12, 1917 |
| 1,384,002 | Sundhaussen | July 5, 1921 |
| 1,600,071 | Shaifer | Sept. 14, 1926 |
| 2,220,007 | Winther et al. | Oct. 29, 1940 |
| 2,389,572 | Winther | Nov. 20, 1945 |

Certificate of Correction

Patent No. 2,518,159 August 8, 1950

HAROLD M. MARTIN

It is hereby certified that error appears in the printed specification of the above numbered patent requiring correction as follows:

Column 4, line 7, for the words "between said" read *between said outer*;

and that the said Letters Patent should be read as corrected above, so that the same may conform to the record of the case in the Patent Office.

Signed and sealed this 9th day of January, A. D. 1951.

[SEAL]

THOMAS F. MURPHY,
*Assistant Commissioner of Patents.*